(12) United States Patent
Gaibler et al.

(10) Patent No.: US 8,376,434 B2
(45) Date of Patent: Feb. 19, 2013

(54) SHACKLE BOW AND SHACKLE

(75) Inventors: Dennis Gaibler, Wilsonville, OR (US); Michael L. Hall, Jefferson, LA (US)

(73) Assignee: The Ulven Companies, Hubbard, OR (US)

( * ) Notice: Subject to any disclaimer, the term of this patent is extended or adjusted under 35 U.S.C. 154(b) by 0 days.

(21) Appl. No.: 13/381,909

(22) PCT Filed: Jun. 28, 2010

(86) PCT No.: PCT/US2010/040199
§ 371 (c)(1),
(2), (4) Date: Dec. 31, 2011

(87) PCT Pub. No.: WO2011/002713
PCT Pub. Date: Jan. 6, 2011

(65) Prior Publication Data
US 2012/0104783 A1 May 3, 2012

Related U.S. Application Data

(60) Provisional application No. 61/270,087, filed on Jul. 1, 2009.

(51) Int. Cl.
*B66C 1/12* (2006.01)
(52) U.S. Cl. .......................... 294/74; 294/82.1
(58) Field of Classification Search .................. 294/74, 294/82.1, 82.11; 59/86
See application file for complete search history.

(56) References Cited

U.S. PATENT DOCUMENTS

| | | | |
|---|---|---|---|
| 1,719,673 A | 7/1929 | Rottmer | |
| 2,354,280 A * | 7/1944 | Russell | ........................... 294/74 |
| 3,958,411 A | 5/1976 | Bernt | |
| 4,079,584 A * | 3/1978 | Shahan | ........................... 59/35.1 |
| 4,914,903 A | 4/1990 | Bernt et al. | |
| 5,103,755 A | 4/1992 | Garrett | |
| 5,193,480 A | 3/1993 | Garrett | |
| 5,413,445 A | 5/1995 | Cartellone | |
| 6,023,927 A | 2/2000 | Epstein | |
| 7,393,033 B1 | 7/2008 | Bisso, IV | |
| 7,654,594 B2 | 2/2010 | Bisso, IV | |
| 8,205,922 B1 * | 6/2012 | Ohman, Jr. | ................. 294/82.11 |

FOREIGN PATENT DOCUMENTS

| | | |
|---|---|---|
| JP | 03099232 B1 | 8/2000 |
| JP | 03088391 U9 | 6/2002 |

OTHER PUBLICATIONS

International Search Report of the International Searching Authority, mailed Feb. 1, 2011, for corresponding International Application No. PCT/US2010/040199, 3 pages.

Written Opinion of the International Searching Authority, mailed Feb. 1, 2011, for corresponding International Application No. PCT/US2010/040199, 4 pages.

(Continued)

*Primary Examiner* — Saul Rodriguez
*Assistant Examiner* — Gabriela Puig
(74) *Attorney, Agent, or Firm* — Klarquist Sparkman, LLP

(57) ABSTRACT

A shackle bow comprises a generally U-shaped body having a first end, a second end and aligned openings defined in the first and second ends. The body has a load bearing portion positioned between the first and second ends. The load bearing portion has a cross section comprising a bearing surface that curves through more than 180 degrees and an intersecting channel-shaped supporting surface. The channel-shaped supporting surface comprises opposing channel side portions extending from opposite sides of a channel base surface and a series of spaced apart ribs connecting the opposing channel side portions to each other.

20 Claims, 6 Drawing Sheets

OTHER PUBLICATIONS http://www.thecrosbygroup.com/html/default.htm, The Crosby Group Catalog, Crosby Shackles, printed Apr. 23, 2010, 5 pages.

http://www.manchestersling.com/index.php?target=products&product_id=30021, Manchester Sling Company—Shacles: Wide Body Sling Shackles: Green Pin Sling Shackles, printed Apr. 23, 2010, 2 pages.

http://www.vanbeest.nl/public/files/catalogue/en/Chapter01_Shackles.pdf, Van Beest Green Pin Catalog, Chapter 1—Shackles, printed Apr. 23, 2010, 40 pages.

http://www.thecrosbygroup.com/html/default.htm, The Crosby Group Catalog, Crosby Shackles, printed Apr. 23, 2010, pp. 72-74, 410, 69.

http://www.manchestersling.com/index.php?target=products&product_id=30021, Manchester Sling Company—Shackles: Wide Body Sling Shackles: Green Pin Sling Shackles, printed Apr. 23, 2010, 2 pages.

http://www.vanbeest.nl/public/files/catalogue/en/Chapter01_Shackles.pdf, Van Beest Green Pin Catalog, Chapter 1—Shackles, printed Apr. 23, 2010, pp. 10-49.

* cited by examiner

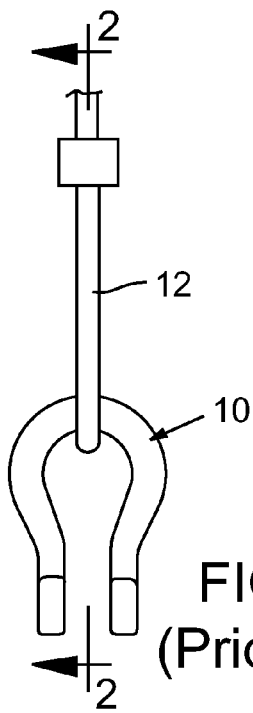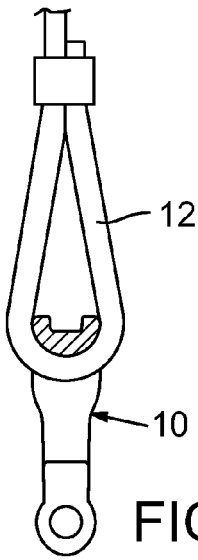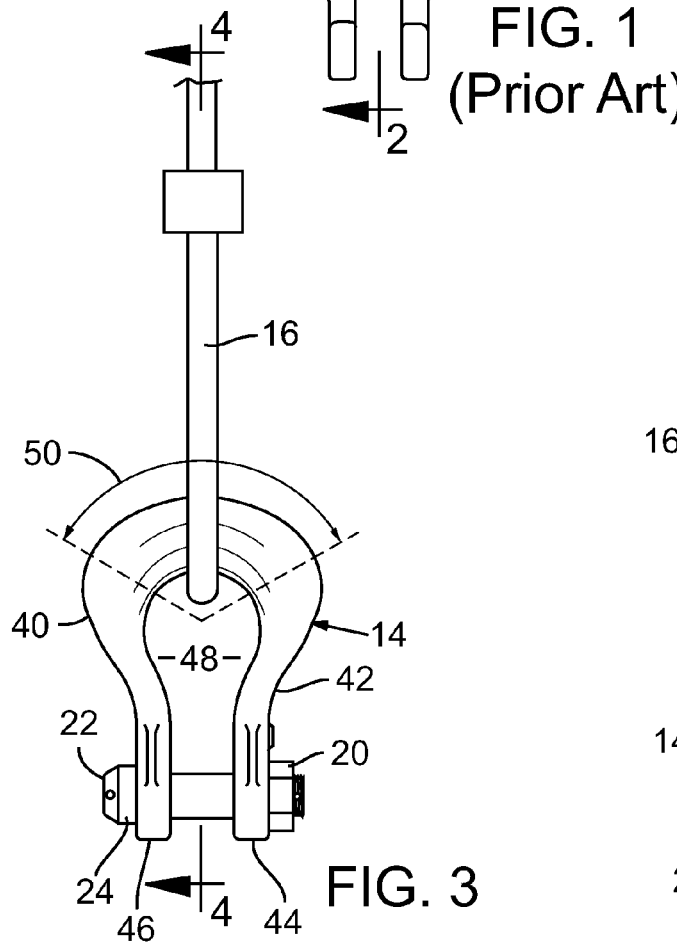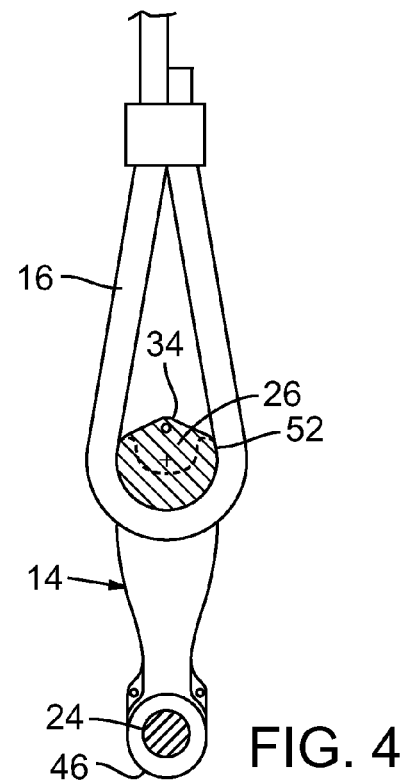

SHACKLE BOW AND SHACKLE

CROSS REFERENCE TO RELATED APPLICATIONS

This is the U.S. National Stage of International Application No. PCT/US2010/040199, filed Jun. 28, 2010, which claims the benefit of U.S. Provisional Patent Application No. 61/270,087, filed Jul. 1, 2009. These applications are hereby incorporated by reference.

FIELD

This application relates to rigging equipment, and in particular, to load-bearing shackles.

BACKGROUND

Shackles are typically used to couple together rigging components and loads to allow for lifting and/or moving of the loads. For example, shackles are frequently used in coupling together load lifting ropes and slings. Conventional shackles may cause unnecessary wear in lifting ropes and slings, and in some cases, cause slings to become kinked. Particularly as wider slings made of synthetic materials become more widely used, there is a need for a new shackle design that addresses the problems with conventional shackles.

SUMMARY

Described below is a new shackle bow and shackle that address some of the problems with conventional shackles.

According to some embodiments, a new shackle bow comprises a generally U-shaped body having a first end, a second end and aligned openings defined in the first and second ends. The body has a load bearing portion positioned between the first and second ends. The load bearing portion has a cross section comprising a bearing surface that curves through more than 180 degrees and an intersecting channel-shaped supporting surface. The channel-shaped supporting surface comprises opposing channel side portions extending from opposite sides of a channel base surface and a series of spaced apart ribs connecting the opposing channel side portions to each other.

In some embodiments, at least a majority of the ribs are dimensioned not to extend beyond the channel side portions. In some embodiments, at least one rib comprises a lifting ear, and the lifting ear may project outward beyond the channel side portions. The series of spaced apart ribs can comprise, as examples, at least five ribs or seven ribs.

In some embodiments, the bearing surface curves continuously through at least 210 degrees. In some embodiments, the bearing surface curves continuously through about 240 degrees.

The generally U-shaped body can be configured to define an opening sufficiently large to accommodate at least two slings. The load bearing portion of the U-shaped body can be spaced from each of the first end and the second end and define a working range having an included angle of about 120 degrees. In the areas adjacent intersections between the bearing surface and the channel shaped supporting surface, the bearing surface can have a partial teardrop shape in cross section to follow closely the contours of an eye of a sling.

According to some embodiments, a shackle comprises a generally U-shaped body having a first end, a second end, aligned openings defined in the first and second ends and a shackle pin connecting the ends. The body has a load bearing portion positioned between the first and second ends. The load bearing portion has a cross section comprising a bearing surface that curves through more than 180 degrees and an intersecting channel-shaped supporting surface. The channel-shaped supporting surface comprises opposing channel side portions extending from opposite sides of a channel base surface and a series of spaced apart ribs connecting the opposing channel side portions to each other.

The radius of curvature of the bearing surface can decrease in a direction approaching intersections between the bearing surface and the channel-shaped supporting surface. The shackle can comprise an electronically readable identifier.

The foregoing and additional features and advantages of the disclosed embodiments will become more apparent from the following detailed description, which proceeds with reference to the following drawings.

BRIEF DESCRIPTION OF THE DRAWINGS

FIG. 1 is a front elevation view of a conventional shackle connected to a single rope, which could be an in-line pull load-lifting rope or a sling.

FIG. 2 is a side sectional view in elevation of the shackle of FIG. 1, taken along the line 2-2 of FIG. 1.

FIG. 3 is a front elevation view of a new shackle shown connected to a single rope.

FIG. 4 is a side sectional view in elevation of the shackle of FIG. 3, taken along the line 4-4.

DETAILED DESCRIPTION

Described below are representative embodiments that are not intended to be limiting in any way. Instead, the present disclosure is directed toward novel and non-obvious features, aspects and equivalents of the shackle bow and shackle described below. The disclosed features and aspects of the embodiments can be used alone or in various novel and nonobvious combinations and sub-combinations with one another.

Figure 5:
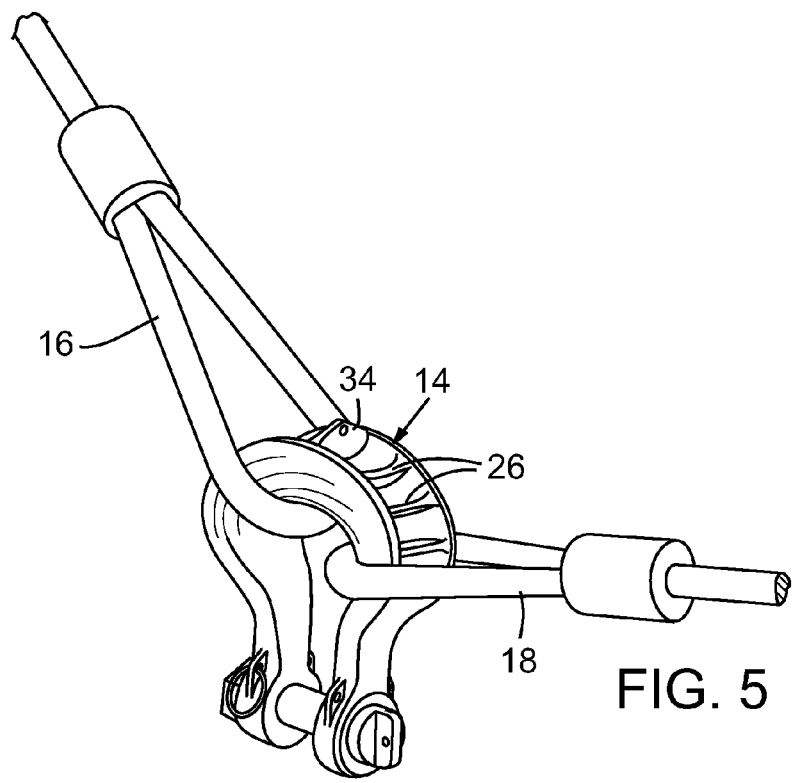
FIG. 5 is a perspective view of the new shackle connected to a double rope or sling and having an included angle between the connection points of about 120°.

Referring to FIGS. 3 and 4, a new shackle 14 has a large sweep angle or load bearing portion 50, as well as a contact area with an eye of a rope 16 that is large and smoothly shaped. As shown FIG. 3, the sweep angle or load bearing portion 50 extends about 120° in some embodiments, which is sufficient to prevent any kinking of the rope or sling in all normal rigging arrangements and allows for at least one second rope 18 to be accommodated with the rope 16 (FIG. 5).

Figure 6:
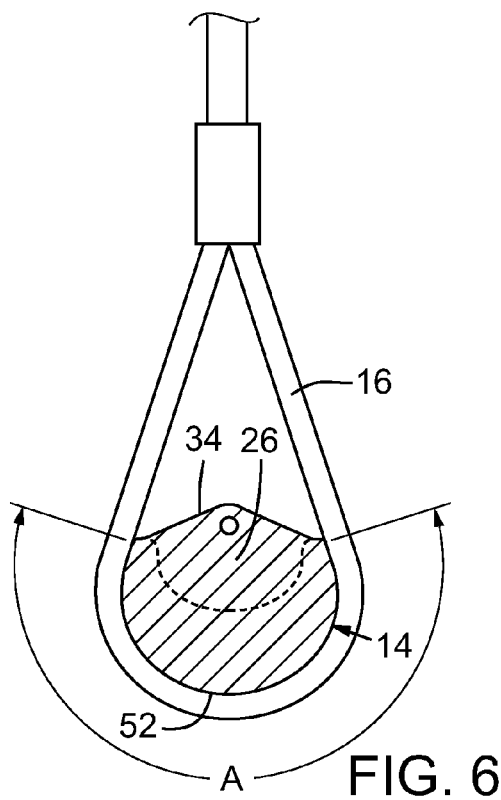
FIG. 6 is an enlarged view of a portion of FIG. 4 showing how the new shackle cross section has a greater contact area and angular range of contact with the rope or sling and avoids sharp transitions where the rope or sling and shackle diverge from each other.
Figure 7:
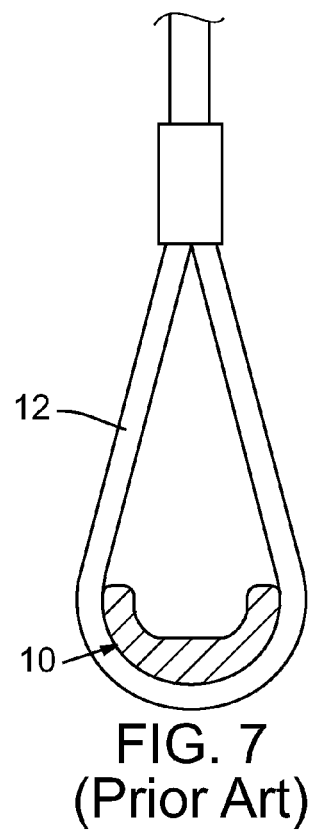
FIG. 7 is an enlarged view comparable to FIG. 6 and showing the conventional shackle of FIGS. 1 and 2 connected to a rope or sling 12 that provides only a lower angular range of contact and sharper transitions.
Figure 8:
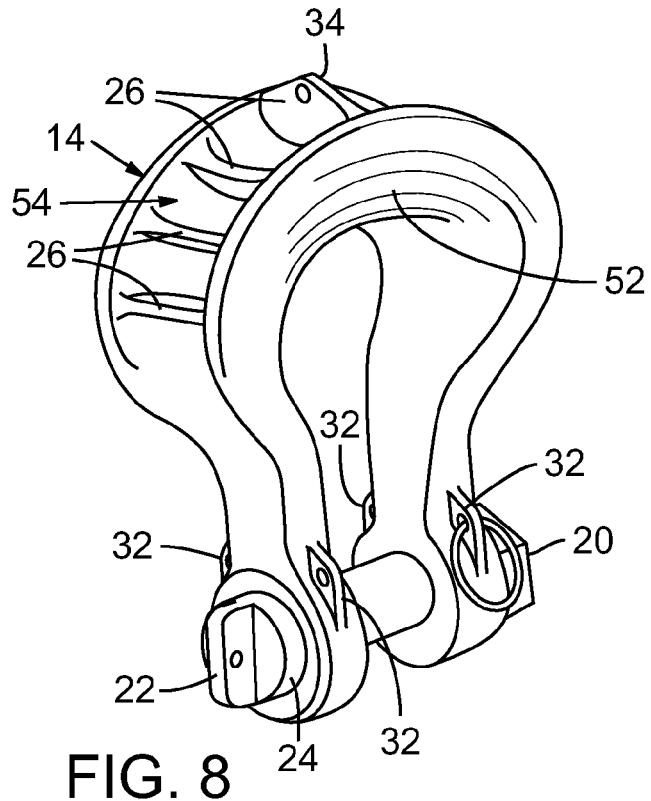
FIG. 8 is another perspective view of the new shackle showing the shackle pin.

As shown in FIGS. 4 and 6, in viewing the cross section of the upper portion of the shackle, there is a smoothly shaped bearing surface 52 providing for contact with a rope or sling over an angle A, e.g., up to 240 degrees in some embodiments. A conventional wide body shackle 10 which is threaded through a rope or sling 12 is shown in FIGS. 1 and 2. Comparing FIGS. 4 and 6 to the conventional wide body shackle 10 shown in FIGS. 2 and 7, it can be seen that that the bearing surface 52 of the new shackle 14 provides much greater contact area and smoother transitions at the ends of the bearing surface 52, which means the ropes and slings tend to wear and/or fray less, particularly in the case of synthetic materials, thus contributing to a longer useful life with greater load capacity than with conventional shackles.

Figure 9:
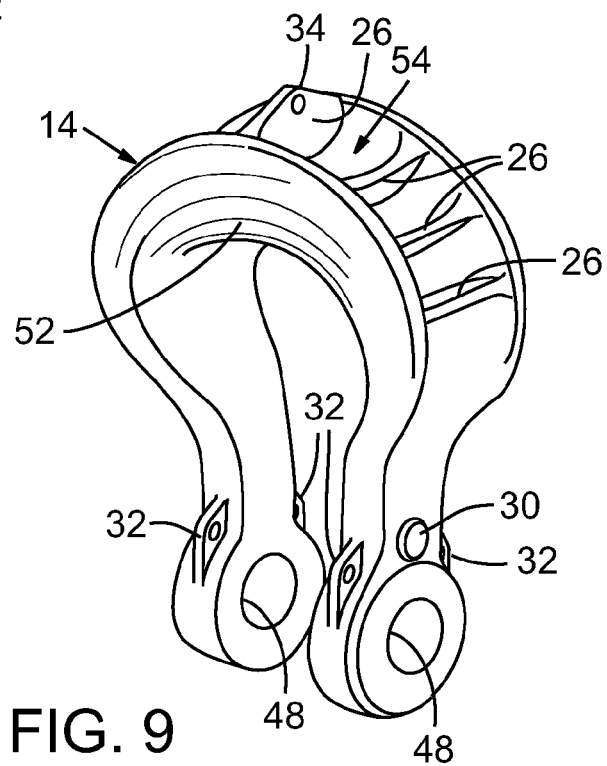
FIG. 9 is another perspective view of the shackle of FIG. 8, but without the shackle pin 18 shown and showing an RFID tag portion and lifting ears on the shackle.

Referring again to FIG. 3, the shackle 14 is comprised of a shackle bow 40 and a shackle pin 24 (described in further detail below). The shackle bow 40 comprises a generally U-shaped body 42 having a first end 44 and an opposed second end 46. Openings 48 (FIG. 9) in the first and second ends 44, 46 are aligned and dimensioned to receive the shackle pin 24. The load bearing portion 50 referred to above is at least a portion of the body 42 between the first and second ends 44, 46. In the illustrated embodiments, the load bearing portion 50 is spaced from the first and second ends 44, 46. The load bearing portion 50 has a cross section comprising the bearing surface 52 that curves through more than 180 degrees and a channel-shaped supporting surface 54 or trough portion that intersects the ends of the bearing surface (see, e.g., FIGS. 8-15).

Figure 10:
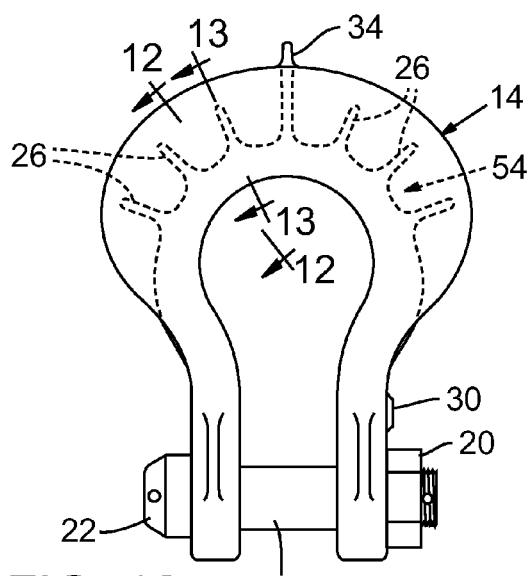
FIG. 10 is a front elevational view of the new shackle showing the configuration of the ribs in dashed lines.
Figure 11:
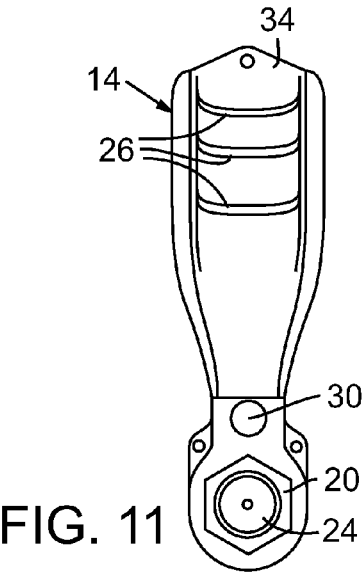
FIG. 11 is a side elevation view of the new shackle.
Figure 12:
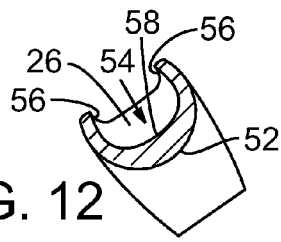
FIGS. 12 and 13 are sectional views taken along the sectional lines 12-12 and 13-13, respectively, of FIG. 10.
Figure 13:
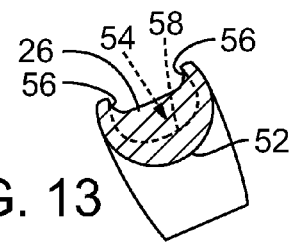
Figure 14:
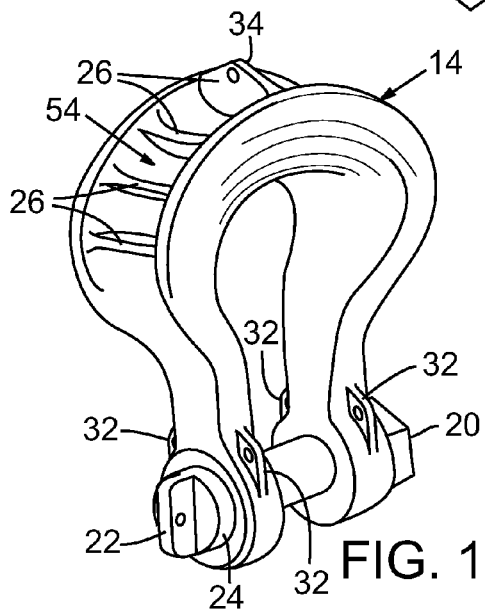
FIGS. 14 and 15 are additional perspective views of the new shackle.
Figure 15:
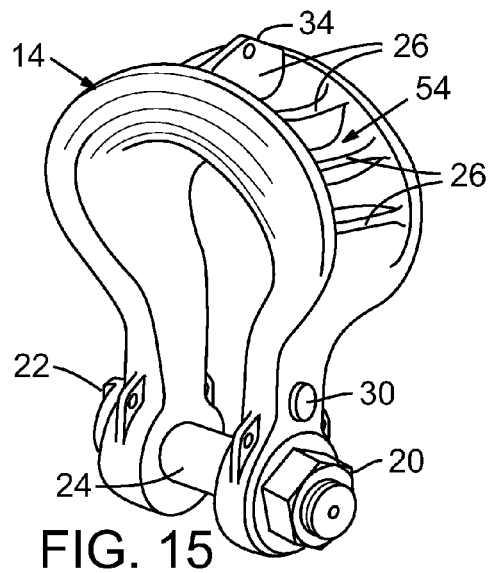
Figure 16:
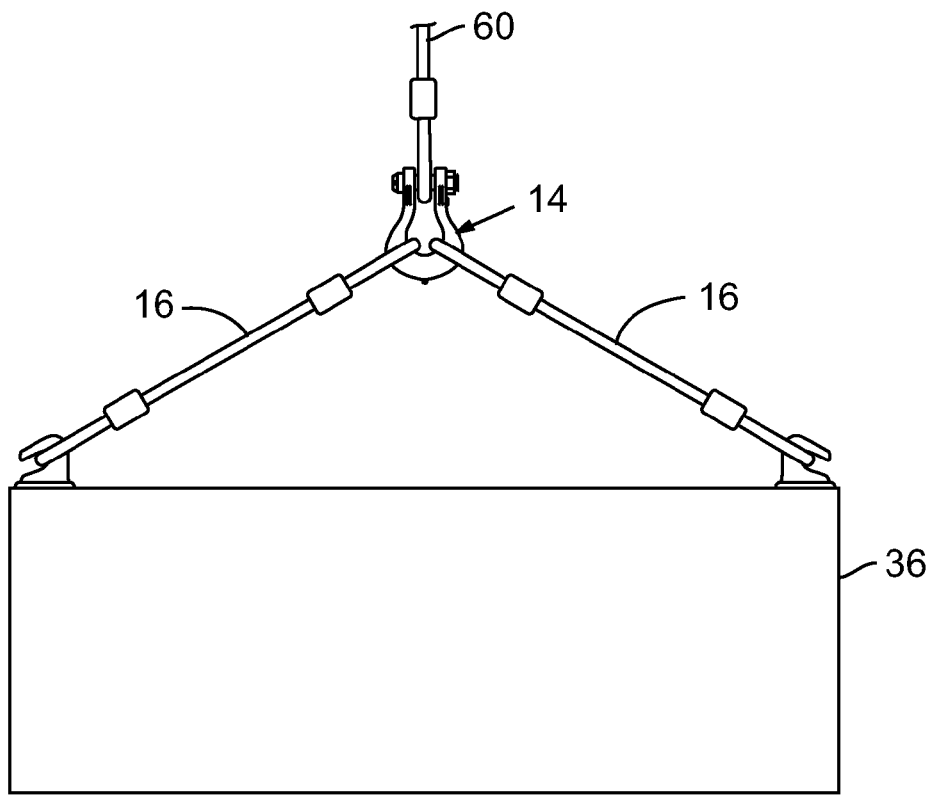
FIGS. 16, 17 and 18 are side elevation, top plan and top perspective views, respectively, of the new shackle connected to two slings extending from corners of a box load and to a rope or lifting cable for lifting the box load.
Figure 17:
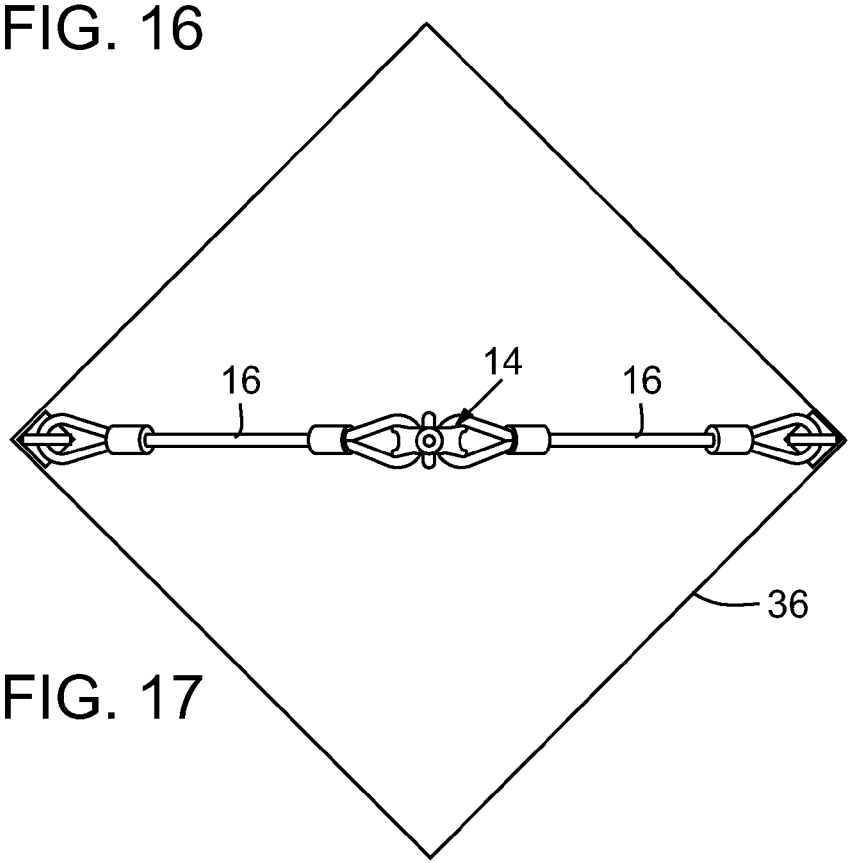
Figure 18:
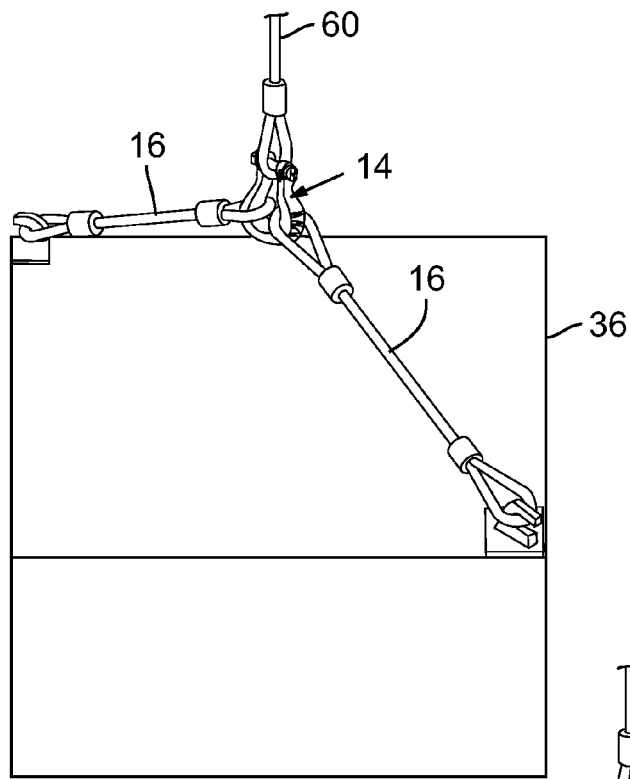
Figure 19:
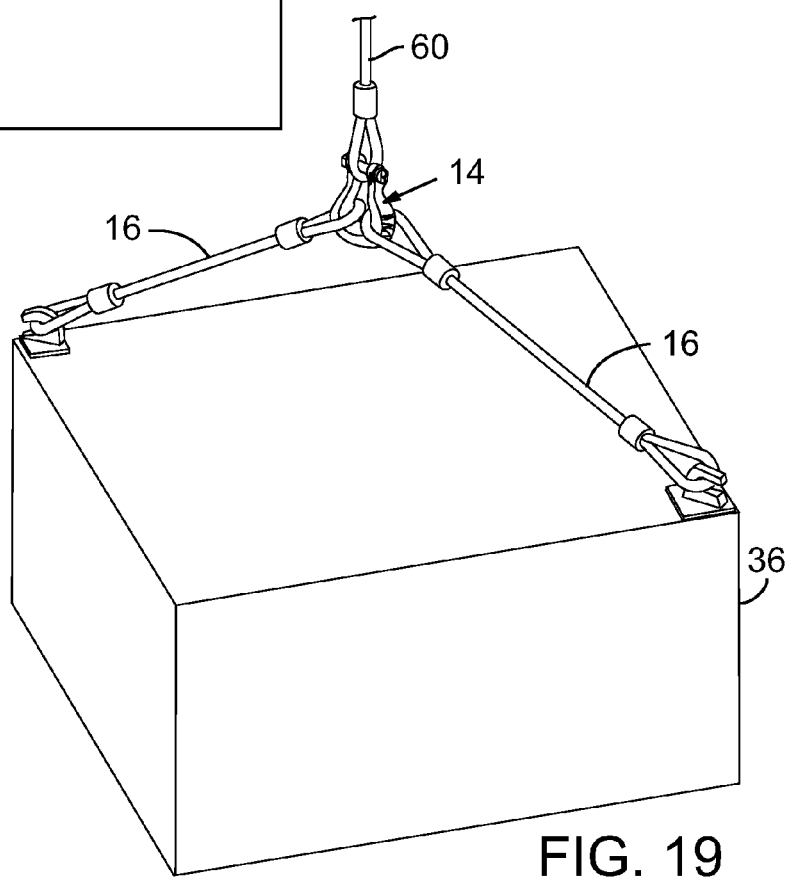
FIG. 19 is another perspective view of the new shackle similar to FIG. 18, but from a slightly different perspective.

Referring to FIGS. 12 and 13, the channel-shaped supporting surface 54 or trough portion comprises opposing channel side portions 56 that extend from opposite sides of a channel base surface 58. As best shown in FIGS. 8-15, there are a series of spaced apart ribs 26 positioned generally within the load bearing portion 50 and extending laterally between the opposing channel side portions 56 to connect them to each other. These ribs 26 significantly increase the strength of the shackle structure without needlessly increasing its weight. As shown in FIG. 10, in one embodiment there are seven such ribs 26, with the center rib also being extended to serve as a lifting ear 34. In the illustrated embodiments, the positions of the first and last ribs generally correspond to the outer limits of the recommended working range and provide a user with a quick guide to correct rigging. As also shown in FIG. 10, the ribs 26 can be dimensioned to have a height lower than the adjacent channel side portions 56.

The shackle 14 can include lifting ears or tabs, such as the lifting ears 32 and 34 shown in the figures. For a shackle 14 in a large size, the lifting ears 32 and 34 provide attachment points for other rigging to lift or move the shackle into place. The lifting ears 32 and 34 are preferably smoothly shaped to prevent incidental damage to slings and ropes during use of the shackle 14.

The shackle 14 can include an electronically readable identifier 30, such as an RFID tag. The identifier 30 can provide manufacture date, serial number, use and service history, usage directions and ratings and/or other types of information. Although not specifically shown, it is course possible to have individual component identifiers, e.g., to have an identifier for the shackle pin 24 as well as for the shackle bow 40.

The shackle pin 24 in the illustrated embodiments preferably has an enlarged pin head 22 at one end and a nut 20 at the other end. In some embodiments, an Acme thread is used to provide a stronger threaded connection and greater resistance to damage during use. The enlarged pin head 22 can have a wrenching flat and rounded corners where possible to minimize damage to ropes and slings during use.

FIGS. 16-19 show various views of the shackle 14 coupled to a lifting rope 60 in the area of the shackle pin 24 and to two slings 16 which are in turn coupled to a box load 36 being lifted. As shown, the shackle 14 defines an opening sufficient to permit its use with at least two ropes.

Although the shackle bow can be formed of any suitable material, one preferred material is cast steel, such as a 4320 steel alloy. Such a cast steel has good yield and tensile strengths, ductility and toughness, even at low temperatures. The shackle pin can be fabricated from 4340 steel wrought bar steel and subjected to heat treatment. Of course, other suitable materials can be used.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A shackle bow, comprising:
a generally U-shaped body having a first end, a second end and aligned openings defined in the first and second ends,
the body having a load bearing portion positioned between the first and second ends, the load bearing portion having a cross section comprising a bearing surface that curves through more than 180 degrees and an intersecting channel-shaped supporting surface,
the channel-shaped supporting surface comprising opposing channel side portions extending from opposite sides of a channel base surface, and
a series of spaced apart ribs connecting the opposing channel side portions to each other.

2. The shackle bow of claim 1, wherein at least a majority of the ribs are dimensioned not to extend beyond the channel side portions.

3. The shackle bow of claim 1, wherein at least one rib comprises a lifting ear, the lifting ear projecting outward of the channel side portions.

4. The shackle bow of claim 1, wherein the bearing surface curves continuously through at least 210 degrees.

5. The shackle bow of claim 1, wherein the bearing surface curves continuously through about 240 degrees.

6. The shackle bow of claim 1, wherein the series of spaced apart ribs comprises at least five ribs.

7. The shackle bow of claim 1, wherein the series of spaced apart ribs comprises seven ribs.

8. The shackle bow of claim 1, wherein the generally U-shaped body is configured to define an opening sufficiently large to accommodate at least two slings.

9. The shackle bow of claim 1, wherein the load bearing portion of the U-shaped body is spaced from each of the first end and the second end and defines a working range having an included angle of about 120 degrees.

10. The shackle bow of claim 1, wherein adjacent intersections between the bearing surface and the channel shaped supporting surface, the bearing surface has a partial teardrop shape in cross section to follow closely the contours of an eye of a sling.

11. A shackle, comprising:
   a bow comprising a generally U-shaped body having a first end, a second end and aligned openings defined in the first and second ends,
   the body having a load bearing portion positioned between the first and second ends, the load bearing portion having a cross section comprising a bearing surface that curves through more than 180 degrees and an intersecting channel-shaped supporting surface,
   the channel-shaped supporting surface comprising opposing channel side portions extending from opposite sides of a channel base surface,
   a series of spaced apart ribs connecting the opposing channel side portions to each other, and
   a shackle pin sized to connect the first and second ends.

12. The shackle of claim 11, wherein at least a majority of the ribs are dimensioned not to extend beyond the channel side portions.

13. The shackle of claim 11, wherein at least one rib comprises a lifting ear, the lifting ear projecting outward of the channel side portions.

14. The shackle of claim 11, wherein the bearing surface curves continuously through at least 210 degrees.

15. The shackle of claim 11, wherein the bearing surface curves continuously through about 240 degrees.

16. The shackle of claim 11, wherein the series of spaced apart ribs comprises at least five ribs.

17. The shackle of claim 11, wherein the generally U-shaped body is configured to define an opening sufficiently large to accommodate at least two slings.

18. The shackle of claim 11, wherein the load bearing portion of the U-shaped body is spaced from each of the first end and the second end and defines a working range having an included angle of about 120 degrees.

19. The shackle of claim 11, further comprising an electronically readable identifier.

20. The shackle of claim 11, wherein the radius of curvature of the bearing surface decreases approaching intersections between the bearing surface and the channel-shaped supporting surface.

* * * * *